United States Patent Office 2,715,121
Patented Aug. 9, 1955

2,715,121

ALKYL SUGAR DERIVATIVES AND THEIR PREPARATION

William Lawrence Glen, Baie D'Urfe, Quebec, Gordon S. Myers and Richard J. Barber, Ville St. Laurent, Quebec, and Gordon A. Grant, Montreal, Quebec, Canada, assignors, by mesne assignments, to American Home Products Corporation, New York, N. Y., a corporation of Delaware No Drawing. Application September 9, 1950,
Serial No. 184,122

14 Claims. (Cl. 260—209)

The present invention relates to improvements in the conversion of glucose, sucrose, and invert sugar to monoalkyl ethers of hexoses.

The methods described for the preparation of the 3-methyl ether of glucose are unsatisfactory since poor yields are obtained and side reactions take place. The first step proposed consists in condensing glucose with acetone in the presence of a strong condensing agent comprising concentrated sulphuric acid or a mixture of zinc chloride, phosphorus pentoxide and phosphoric acid. These methods of carrying out the condensation result in poor yields, charring of the diacetone glucose and polymerization of the acetone.

The second stage of the prior synthesis consists in methylating the diacetone glucose to obtain 3-methyl diacetone glucose. The methylation is carried out with methylating agents such as methyl iodide in the presence of silver oxide (Irvine and Hynd, J. Chem. Soc. 1909, 95, 1220), or methyl iodide in the presence of metallic sodium (Freudenberg and Hixon, Ber., 1933, 56, 2119) or dimethyl sulphate in the presence of aqueous potassium hydroxide (Schmidt and Simon, J. fur prakt. Chemie, 1939, 152, 194). These methods have been found unsatisfactory in that the reaction does not result in effective alkylation and good yields of the desired 3-methyl diacetone glucose unless a large excess of alkylating agent is employed.

Removal of the isopropylidene groups is carried out by the use of relatively large quantities of acid which must be eliminated from the final hydrolysate. Elimination of this excess acid is effected by treatment with barium carbonate (Loder and Lewis, J. Am. Chem. Soc. 1932, 54, 1045), silver carbonate (Irvine et al., J. Chem. Soc. 1913, 569, ibid. 1914, 1390), and lead acetate (Schmidt and Simon, J. fur prakt. Chemie, 1939, 152, 194).

The preparation of 1-methyl fructose has been described by Ohle (Ber. 1925, 58, 2577) who recorded difficulty in effecting the methylation of the intermediate β-diacetone fructose and in the removal of the isopropylidene groups at the last stage of the synthesis. For the preparation of 3-methyl fructose several investigators have recorded difficulty in the methylation of α-diacetone fructose using either methyl iodide and silver oxide or metallic sodium and methyl iodide.

Ohle (loc. cit.) and Bell (J. Chem. Soc. 1947, 1461) have shown only the preparation of a mixture of diacetone glucose and β-diacetone fructose using sulphuric acid as condensing agent to effect fission of the sucrose and acetonation.

So far as the applicants are aware, these are the only methods for converting glucose, sucrose or invert sugar to monoalkyl ethers of hexoses; the only such monoalkyl ethers disclosed are 3-methyl glucose, 1-methyl fructose and 3-methyl fructose.

It is now the purpose of the present invention to prepare by novel steps and in greater yields 3-alkyl ethers of glucose from glucose, mixtures of 1-alkyl ethers of fructose and 3-alkyl ethers of glucose from sucrose, 3-alkyl ethers of fructose from invert sugar and 1-alkyl ethers of fructose from sucrose.

The applicants have now developed simple procedures for converting glucose, sucrose or invert sugar to various monoalkyl ethers of hexoses. These procedures include in sequence under special conditions, acetonation, alkylation, and hydrolysis. The acetonation is carried out in the presence of a mild condensing agent, for example, zinc chloride alone or in admixture with phosphoric acid, or low concentrations of sulphuric acid, as opposed to the strong condensing agents used previously. This results in an improved yield and gives a substantially pure diacetone derivative free from acetone polymers in contrast to the charred products and low yields obtained in the prior art.

The diacetone derivative which is usually separated from the reaction mixture is then alkylated, using, for example, an alkyl halide or alkyl sulphate under special conditions, that is, in the presence of solid alkali hydroxide. Under the conditions of this procedure unexpectedly high yields of the monoalkyl ethers of the diacetone derivatives are obtained.

The isopropylidene radicals are then removed by a novel hydrolysis procedure. It has been found that very weakly acid conditions as opposed to the relatively high concentrations of acid employed in the prior art are equally effective for the hydrolysis and the method is superior since the necessity of the removal of the excess acid is circumvented.

ACETONATION

The production of diacetone glucose from glucose, and a mixture of diacetone glucose and β-diacetone fructose from sucrose, is effected by a process of acetonation using a mild condensing agent, consisting of anhydrous zinc chloride and a small amount of phosphoric acid.

The mixture of diacetone glucose and β-diacetone fructose may then be converted by subsequent alkylation and hydrolysis to give a mixture of 3-alkyl glucose and 1-alkyl fructose. If desired the mixture of diacetone hexoses may be partially hydrolyzed and extracted with a water-immiscible organic solvent to obtain β-diacetone fructose which may then be converted to obtain 1-alkyl ethers of fructose.

α-diacetone fructose is prepared from invert sugar by acetonation in presence of anhydrous zinc chloride or a very low concentration of mineral acid, such as, sulphuric acid in a concentration of 0.3 to 0.5% by volume. The product thus obtained is predominantly α-diacetone fructose but may contain minor amounts of diacetone glucose and β-diacetone fructose. The desired α-diacetone fructose is isolated from the mixture by dilution with water and extraction with a water-immiscible organic solvent, for example, chloroform.

The diacetone derivatives are substantially pure products which are not charred and which are free from acetone polymers. The diacetone derivatives can be isolated from the reaction mixture by extraction with a water-immiscible organic solvent, for example, chloroform.

In addition to higher yields and the substantial freedom from condensation products, the condensing agent of the present invention requires only about 10 parts of acetone to 1 part of the sugar in contrast to the much larger amounts of acetone in the prior art methods.

ALKYLATION

The preferred alkylating agents are alkyl sulphates or alkyl halides. Preferred alkyl halides are for example, methyl chloride, iodide, or bromide, ethyl bromide or chloride, propyl bromide or chloride or butyl bromide.

Preferred alkyl sulphates are for example, methyl, ethyl, propyl or butyl sulphates. The alkylation may be carried out in the presence or absence of an inert solvent. The preferred solvents are for example, acetone, benzene, or ether. Separation of the alkyl diacetone glucose and/or fructose from the reaction mixture is carried out by extraction with a water-immiscible organic solvent, for example, chloroform, toluene or benzene.

HYDROLYSIS

The hydrolysis of the monoalkyl ethers of diacetone glucose and/or fructose is effected using very low acid concentrations, for example, by heating in water adjusted to a pH of from about 2 to about 3. It has also been found that the hydrolysis of the 3-monoalkyl ethers of diacetone glucose and α-diacetone fructose can be carried out by heating to boiling in the presence of an aqueous suspension of an acid-form ion-exchange resin, for example, "Amberlite I. R. 120," which also produces mild acid conditions.

The desired alkyl ethers are isolated in the usual way after decolourization with activated charcoal, for example, "Norite," by evaporation and subsequent purification by crystallization from a suitable solvent, for example, alcohol.

EXAMPLES

The present invention will be more fully understood by referring to the following examples which are given in an illustrative sense only.

Example 1

DIACETONE GLUCOSE

To a mechanically stirred suspension of 300 g. of glucose in 2000 cc. of acetone, 240 g. of anhydrous pulverized zinc chloride and 15 g. of 85% phosphoric acid are added and stirring is continued for 24 hours at room temperature. At the end of this period undissolved sugar is removed by filtration and washed with a little acetone; the combined filtrate and washings are adjusted to pH 8 by addition of 50% aqueous sodium hydroxide with cooling and the precipitated inorganic material filtered and washed with acetone. The combined filtrate and acetone washings are concentrated under reduced pressure then diluted with 300 cc. of water and extracted four times with chloroform (4×200 cc.). The chloroform extract is washed with water, then concentrated under reduced pressure to give a white crystalline residue of diacetone glucose. Yield 90%.

3-METHYL DIACETONE GLUCOSE

To a stirred mixture of 78 g. of diacetone glucose, 75 cc. of acetone and 32 g. of pulverized sodium hydroxide, 42.6 cc. of dimethyl sulphate are added dropwise, over a period of 90 minutes maintaining a temperature of 45° C. When the addition of dimethyl sulphate is complete the temperature of the reaction mixture is raised to 50° C. for a period of 90 minutes and finally to 55 to 60° C. for a period of 3 hours. The reaction mixture is cooled, diluted with water and extracted with chloroform (3×150 cc.). The chloroform extracts are combined, washed with water and concentrated under reduced pressure to give 3-methyl diacetone glucose in almost quantitative yield.

Or, if desired, the 3-methyl diacetone glucose may be obtained, as follows:

A mixture of 52 g. of diacetone glucose, 24 g. of pulverized sodium hydroxide, 50 cc. of acetone and 26 cc. of liquid methyl chloride is agitated and heated at 145–150° C. for 8 hours under pressure. The cooled reaction mixture is diluted with water and extracted with chloroform. Evaporation of the chloroform extract gives 3-methyl diacetone glucose in almost theoretical yield.

3-METHYL GLUCOSE

A mixture of 83 g. of 3-methyl diacetone glucose and 150 cc. of water adjusted to pH 2 to 3 with sulphuric acid is heated under reflux for 6 hours and the warm hydrolysate is stirred with 4 g. of charcoal and filtered. The hydrolysate is concentrated under reduced pressure and the residue rubbed with acetone. 3-methyl glucose is obtained as a white crystalline powder. Yield 80–90%.

Example 2

3-ETHYL DIACETONE GLUCOSE

A mixture of 78 g. of diacetone glucose (obtained as in Example 1), 32 g. of pulverized sodium hydroxide and 75 cc. of acetone is warmed with stirring to 45° C. and 61 cc. of diethyl sulphate is added dropwise to it over a period of 90 minutes. The temperature during the addition is maintained at 45° C. with slight cooling. After stirring for an additional period of 90 minutes at 50° C. and for 3 hours at 55–60° C., the mixture is diluted with water and the product extracted with chloroform. Removal of the chloroform leaves residue of the liquid 3-ethyl diacetone glucose. Yield almost theoretical.

3-ETHYL GLUCOSE

A mixture of 96 g. of 3-ethyl diacetone glucose and 3 parts of water adjusted to pH 2 to 3 with sulphuric acid is refluxed for 6 hours. The warm hydrolysate so obtained is decolourized with charcoal ("Norite") and concentrated to dryness under reduced pressure. The viscous syrupy residue is crystallized by rubbing with a little warm acetone.

One such preparation melted at 140–145° C. after crystallizing from alcohol and gave the following analysis:—
$C_8H_{16}O_6$: requires C, 46.2; H, 7.73; ethoxy, 21.6%. Found: C, 46.3; H, 7.96; ethoxy, 21.0%.

Example 3

3-n-PROPYL DIACETONE GLUCOSE

Diacetone glucose (52 g.) acetone (50 cc.), n-propyl bromide (74 g.) and pulverized sodium hydroxide (32 g.) are added to an autoclave and warmed with agitation to 150° C. for 9 hours. The contents are cooled, extracted with chloroform, and the combined chloroform extracts washed with water and concentrated to a liquid residue of crude 3-n-propyl diacetone glucose (65 g.).

3-n-PROPYL GLUCOSE

Crude 3-n-propyl diacetone glucose obtained as above (65 g.) is boiled for 8 hours with 3 parts of water adjusted to pH 2.1 with sulphuric acid. The hydrolysate is then extracted twice with chloroform (2×75 cc.) to remove the dark-coloured impurities. The combined water extracts are warmed and decolourized with charcoal (3 g.) and then concentrated to give a solid crystalline residue of 3-n-propyl glucose. Yield 86%, based on the diacetone glucose used in the previous stage.

One such preparation, crystallized from methanolether melted at 130–131° C. and gave the following analysis:
$C_9H_{18}O_6$: requires C, 48.6; H, 8.15; $OC_3H_7$, 26.8%. Found: C, 49.1; H, 8.25; $OC_3H_7$, 27.4%.

Example 4

3-n-BUTYL DIACETONE GLUCOSE n-Butyl bromide (82.2 g.), diacetone glucose (52 g.) pulverized sodium hydroxide (36 g.) and acetone (50 cc.) are warmed together in an autoclave at 150° C. for 9 hours. The crude 3-n-butyl diacetone glucose (isolated as described above for 3-n-propyl diacetone glucose) is distilled and the fraction boiling at 120–123° C./1 mm. is collected. Yield 87%.

One such preparation gave the following analysis: $C_{16}H_{28}O_6$: requires C, 60.7; H, 8.92%. Found: C, 62.3; H, 8.92%.

3-n-BUTYL GLUCOSE

The distilled 3-n-butyl diacetone glucose obtained above is refluxed for 8 hours with 3 parts of water adjusted to pH 2.1 with sulphuric acid and the 3-n-butyl glucose is isolated from the hydrolysate in a manner similar to that described for 3-n-propyl glucose. Yield 98%.

One such preparation crystallized from methanol-ether melted at 137-139° C. and gave the following analysis:

$C_{10}H_{20}O_6$: requires C, 50.8; H, 8.55%. Found: C, 51.2; H, 8.58%.

Example 5

(a) HYDROLYSIS AND ACETONATION OF SUCROSE

A mixture of sucrose (600 g.), acetone (4000 cc.), anhydrous, pulverized zinc chloride (480 g.) and 85% phosphoric acid (30 g.) is stirred for 60 hours at room temperature. Complete solution results and the reaction mixture is cooled and treated with aqueous sodium hydroxide solution (320 g. sodium hydroxide dissolved in 320 cc. of water) with efficient agitation. The precipitated inorganic material is removed by filtration, washed with acetone and the combined filtrate and washings concentrated. The residue is diluted with water (500 cc.), extracted thrice with chloroform (3×300 cc.) and the chloroform extract washed with water and concentrated under reduced pressure. The product is essentially a mixture of equal quantities of diacetone glucose and β-diacetone fructose. Yield 85-87%.

(b) METHYLATION OF THE MIXTURE OF β-DIACETONE FRUCTOSE AND DIACETONE GLUCOSE

A solution of 78 g. of the crude mixture of diacetone glucose and β-diacetone fructose obtained as above, in 75 cc. of acetone and pulverized sodium hydroxide (46.2 g.) is stirred and warmed to 45° C. Dimethyl sulphate (50 cc.) is now added dropwise over a period of 90 minutes and at the end of this addition the temperature of the reaction mixture is raised to 50° C. and maintained thereat for 1 hour. Methylation is finally completed by raising the temperature to 55-60° C. for a period of 3 hours. The cooled reaction mixture is diluted with water and extracted with chloroform. Evaporation of the chloroform extract gives approximately 80 g. of an amber-coloured liquid which is essentially a mixture of 3-methyl diacetone glucose and 1-methyl diacetone fructose.

(c) HYDROLYSIS OF THE MIXTURE OF 1-METHYL DIACETONE FRUCTOSE AND 3-METHYL DIACETONE GLUCOSE

Crude methylated material obtained as above (270 g.) is suspended in 0.1 N sulphuric acid (800 cc.) and stirred at 95-100° C. for 7 hours. The hydrolysate is decolourized with charcoal and the product isolated, after elimination of excess acid. (Excess acid is removed by ion-exchange resins or by calcium carbonate, barium carbonate or the like). Yield 80%. The product is substantially a mixture of equal parts of 3-methyl glucose and 1-methyl fructose and contains no sugar fermentable by yeast.

Example 6

MIXTURE OF MONOETHYL HEXOSES DERIVED FROM SUCROSE

Crude acetonated hexose mixture obtained as in Example 5(a) (130 g.) is ethylated in acetone (130 cc.) with ethyl sulphate (114 cc.) and pulverized sodium hydroxide (62 g.) using conditions similar to those employed for the methylation in Example 5(b). The crude ethylated acetonated hexose mixture (153 g.) is hydrolyzed by stirring with 5 parts of 0.1 N sulphuric acid at 100° C. for 7 hours. The hydrolysate is extracted twice with chloroform (2×150 cc.) to remove the dark-coloured impurities, then decolourized with charcoal, and freed from acid with ion-exchange resin. Concentration gives a syrup which is a mixture of 3-ethyl glucose, and 1-ethyl fructose in approximately equal proportions, together with a small amount of 3-ethyl fructose. Yield 95%.

Example 7

MIXTURE OF MONOPROPYL HEXOSES DERIVED FROM SUCROSE

A mixture of pulverized sodium hydroxide (32 g.) crude acetonated hexose mixture prepared as in Example 5(a) (52 g.) n-propyl bromide (74 g.) and acetone (50 cc.) are agitated at 150° C. in an autoclave for 9 hours. The crude product so obtained (65.5 g.) is hydrolyzed with 0.1 N sulphuric acid and isolated as in Example 6 to give a mixture of 3-n-propyl glucose and 1-n-propyl fructose in approximately equal proportions, together with a small amount of 3-n-propyl fructose. Yield 83%.

Example 8

CRUDE α-DIACETONE FRUCTOSE (a) From invert sugar: Commercial invert sugar syrup (700 g.) is dried under reduced pressure on a steam bath. To the viscous, almost solid resin so obtained (580 g.), acetone (4 litres) and anhydrous pulverized zinc chloride (700 g.) are added. The mixture is stirred for 2 days at room temperature by which time almost all the sugar is dissolved. Sodium hydroxide (450 g.) dissolved in 450 cc. of water is now added dropwise with cooling and the inorganic precipitate is collected and washed with acetone. The filtrate and washes are concentrated and the residue diluted with water (500 cc.) and extracted 4 times with chloroform (4×200 cc.). The chloroform extracts are concentrated to give a residue of crude α-diacetone fructose. Yield 60%, based on the fructose content of the invert sugar. This material was suitable for the preparation of 3-methyl diacetone fructose as described below.

(b) From sucrose: A slurry of sucrose (250 g.) in acetone (1500 cc.) containing concentrated sulphuric acid (4.5 cc.) is stirred at room temperature for 2 days. The undissolved sugar (ca 125 g.) is separated and the filtrate made alkaline with sodium hydroxide and concentrated. The residue is diluted with water, extracted with chloroform and the chloroform evaporated to give crude α-diacetone fructose (137 g.) which probably contains considerable quantities of β-diacetone fructose and diacetone glucose but can be methylated as described below to give good-quality 3-methyl diacetone fructose.

3-METHYL DIACETONE FRUCTOSE (a) From pure α-diacetone fructose: A mixture of α-diacetone fructose (52 g.; M. P. 115-117° C.), acetone (100 cc.) and pulverized sodium hydroxide (21.4 g.) is warmed to 40° C. with stirring and treated at 40-50° C. with dimethyl sulphate (28.4 cc. added dropwise over a period of 75 minutes). Methylation is completed by warming at 50° C. for 90 minutes and finally at 55-60° C. for 3 hours. The sludge is diluted with water, extracted with chloroform and the chloroform extracts washed with water and concentrated to give 3-methyl diacetone fructose. Yield 80-90%.

(b) From crude α-diacetone fructose obtained from invert sugar: This crude α-diacetone fructose (250.3 g.) is mixed with acetone (500 cc.) and sodium hydroxide (144 g.) and warmed with stirring to 45° C. Dimethyl sulphate (183 cc.) is added to the mixture at 40-50° C. over a period of 75 minutes and methylation is completed by warming at 50° C. for one hour and finally at 55-60° C. for 3 hours. The crude product isolated as in Example 8(a), is crystallized from hexane to give good quality 3-methyl diacetone fructose melting at 115-117° C. Yield 45%.

(c) From crude α-diacetone fructose obtained from sucrose: The crude α-diacetone fructose (137 g.) is methylated as in Example 8(b) with proportionate amounts of materials and the crude product is crystallized from hexane to give good-quality 3-methyl diacetone fructose. Yield 30%. Hydrolysis of 3-methyl diacetone fructose to 3-methyl fructose:

(a) Using an acidic ion-exchange resin: A mixture of 3-methyl diacetone fructose (27.4 g.), ion-exchange resin (5 g.; "Amberlite IR–120," acid-form, Rohm and Haas Company, Philadelphia) and water (100 cc.) is stirred at 95–100° C. for 6 hours. The resin is then removed, the solution decolourized with charcoal (4 g.) and concentrated to a syrup which crystallizes on rubbing with a little acetone (35 cc.). Yield 90%.

(b) With water at pH 2.6: 3-methyl diacetone fructose (27.4 g.) is digested for 5 hours on a steam bath with 3 parts of water acidified to pH 2.6 with sulphuric acid. The hydrolysate is decolourized with charcoal and refined as above to give 3-methyl fructose. Yield 93%.

Example 9

β-DIACETONE FRUCTOSE (a) From fructose: A cold solution of phosphorus pentoxide (1.5 g.) in 85% phosphoric acid (3 g.) is added to a mixture of fructose (27 g.), anhydrous zinc chloride (36 g.) and acetone (180 cc.) and the resulting mixture is efficiently agitated at room temperature for 26 hours. The contents are then made alkaline with sodium hydroxide (35 g. of sodium hydroxide dissolved in 35 cc. of water) and the inorganic precipitate filtered and washed with acetone. The filtrate and washes are concentrated and the residue diluted with water and extracted with chloroform. Evaporation of the chloroform gives crude β-diacetone fructose which is purified by stirring at room temperature for 8 hours with 0.1 N sulphuric acid to hydrolyze any α-diacetone fructose (Bell, loc. cit.). The product is extracted from the hydrolysate with chloroform. Yield 65%.

(b) From sucrose: To a well-stirred mixture of sucrose (150 g.) and acetone (1 litre) anhydrous zinc chloride (120 g.) is added, followed by 85% phosphoric acid (20 g.). The mixture, which warms spontaneously to 40° C., is stirred at room temperature for 24 hours by which time all the sugar dissolves. A solution of sodium hydroxide (120 g. of sodium hydroxide dissolved in 120 cc. of water) is now added dropwise with cooling, and the precipitated inorganic salts are collected and washed with acetone. The filtrate and washes are concentrated and the residue is diluted with water (800 cc.) and extracted four times with chloroform (4×200 cc.). The chloroform extracts are water-washed and concentrated. The residue so obtained is stirred for 6 hours with 0.1 N sulphuric acid (500 cc.) to hydrolyze the diacetone glucose (and α-diacetone fructose, if present). Extraction of the hydrolysate with chloroform in the usual manner gives β-diacetone fructose. Yield 75%.

1-METHYL DIACETONE FRUCTOSE FROM β-DIACETONE FRUCTOSE

Using dimethyl sulphate: A mixture of β-diacetone fructose (200 g.), acetone (200 cc.) and pulverized sodium hydroxide (135 g.) is warmed with stirring to 45° C. and treated at this temperature with dimethyl sulphate (146 cc. added over a period of 90 minutes). The mixture is then warmed to 50° C. for 1 hour and finally to 55–60° C. for 3 hours. The slurry is diluted with water, extracted with chloroform and the chloroform extracts washed with water and evaporated to give a residue of 1-methyl diacetone fructose. Yield 95%.

HYDROLYSIS OF 1-METHYL DIACETONE FRUCTOSE TO 1-METHYL FRUCTOSE (a) With 0.1 N sulphuric acid: A suspension of 1-methyl diacetone fructose (411 g.) in 3 parts of 0.1 N sulphuric acid is warmed with stirring to 95–100° C. for 7 hours by which time the sugar has dissolved and hydrolysis is complete. The solution is decolourized with charcoal and concentrated to 600 cc. The sulphuric acid is then removed from the hydrolysate by stirring with either barium carbonate (40 g.) or with an ion-exchange resin "Amberlite IRA–400," (basic form; Rohm and Haas Company, Philadelphia). The final pH is adjusted to 5–5.5 and the sugar solution re-charcoalized and concentrated at 60° C. in a water-bath to give 1-methyl fructose as a sweet-tasting, honey-coloured, resinous syrup. Yield 93%.

(b) At pH 2.6 in an autoclave: A mixture of 1-methyl diacetone fructose (50 g.) and 3 parts of water adjusted to pH 2.6 with sulphuric acid, is heated in an autoclave at 150° C. for 3 hours with shaking. The warm hydrolysate is decolourized with charcoal and concentrated as above. Yield 85%.

We claim:

1. In a process for the preparation of 3-alkyl ethers of fructose, the improved steps of condensing invert sugar with acetone in the presence of a condensing agent consisting essentially of anhydrous zinc chloride and separating from the reaction mixture α-diacetone fructose, and alkylating said α-diacetone fructose with an alkylating agent in the presence of a solid alkali hydroxide to obtain a corresponding 3-alkyl ether of diacetone fructose.

2. A process for the preparation of 3-alkyl ethers of glucose, comprising, condensing glucose with acetone in the presence of a major amount of anhydrous zinc chloride and a relatively minor amount of phosphoric acid as condensing agent to obtain diacetone glucose, alkylating the diacetone glucose with an alkylating agent in the presence of a solid alkali hydroxide to obtain a 3-alkyl ether of diacetone glucose, and hydrolyzing the 3-alkyl ether of diacetone glucose in the presence of water at a pH of from about 2 to about 3 to obtain a 3-alkyl ether of glucose.

3. A process for the preparation of a mixture of 3-alkyl ethers of glucose and 1-alkyl ether of fructose, comprising simultaneously hydrolyzing and acetonating sucrose by condensing said sucrose with acetone in the presence of a major amount of anhydrous zinc chloride and a relatively minor amount of phosphoric acid as condensing agent to obtain a mixture of β-diacetone fructose and diacetone glucose, alkylating said mixture with an alkylating agent selected from the group consisting of alkyl halides and alkyl sulphates in the presence of a solid alkali hydroxide to obtain a mixture of 3-alkyl diacetone glucose and 1-alkyl diacetone fructose, and hydrolyzing said mixture in the presence of water adjusted to a pH of from about 2 to about 3 to obtain a mixture of 3-alkyl ethers of glucose and 1-alkyl ethers of fructose.

4. A process for the preparation of 3-alkyl ethers of fructose, comprising, condensing invert sugar with acetone in the presence of a condensing agent consisting essentially of zinc chloride, isolating from the reaction mixture the α-diacetone fructose, alkylating said diacetone fructose with an alkylating agent selected from the group consisting of alkyl halides and alkyl sulphates in the presence of a solid alkali hydroxide to obtain 3-alkyl ethers of fructose and hydrolyzing said ethers in the presence of water adjusted to a pH of from about 2 to about 3 to obtain the desired 3-alkyl ethers of fructose.

5. A process for the preparation of 1-alkyl ethers of fructose comprising, condensing, sucrose with acetone in the presence of a major amount of anhydrous zinc chloride and a relatively minor amount of phosphoric acid, partially hydrolyzing the reaction mixture and extracting with a water-immiscible organic solvent thereby obtaining β-diacetone fructose, alkylating the β-diacetone fructose with an alkylating agent selected from the group consisting of alkyl halides and alkyl sulphates in the presence of a solid alkali hydroxide to obtain 1-alkyl ethers of β-diacetone fructose and hydrolyzing said 1-alkyl ethers of diacetone fructose in the presence of water adjusted to a pH of from about 2 to about 3 under conditions to obtain the desired 1-alkyl ethers of fructose.

6. As a new product, the 3-ethyl ether of glucose.

7. As a new product, the 3-propyl ether of glucose.

8. As a new product, the 3-butyl ether of glucose.

9. The process comprising reacting a hexose of the group consisting of glucose, fructose, sucrose and invert sugar with acetone in the presence of a mild condensing agent consisting essentially of zinc chloride to obtain the corresponding diacetone hexose, alkylating said diacetone compound with an alkylating agent in the presence of solid alkali hydroxide to form an alkyl ether of said diacetone hexose, and hydrolyzing said alkyl ether derivative in the presence of water under mild acid conditions of pH about 2 to about 3 to obtain the desired monoalkyl ether of the hexose.

10. In a process for the preparation of a monoalkyl ether of fructose comprising reacting fructose with acetone in the presence of a major amount of zinc chloride and a relatively minor amount of phosphoric acid and separating from the reaction mixture β-diacetone fructose, alkylating said diacetone derivative with an alkylating agent in the presence of a solid alkali hydroxide, and then hydrolyzing the alkylated product in an aqueous medium at a pH of about 2 to about 3 under elevated temperature and pressure conditions.

11. The process defined in claim 2, in which the hydrolysis of the 3-alkyl ether of diacetone glucose is carried out by heating in the presence of an aqueous suspension of an acid-form ion-exchange resin.

12. The process defined in claim 2, in which the alkylating agent is an alkyl sulphate.

13. The process defined in claim 2, in which the alkylating agent is an alkyl halide.

14. As new products, 3-alkyl ethers of glucose, wherein the alkyl group has from 2 to 4 carbon atoms.

References Cited in the file of this patent

Carbohydrate Chemistry, Pigman (1948) pgs. 228–231, published by Academic Press, Inc., New York, N. Y.